April 6, 1965  G. POTAPENKO ETAL  3,176,890
PRESSURIZED DISPENSER WITH INTEGRAL CONTAINER SEAL
Original Filed Aug. 14. 1961
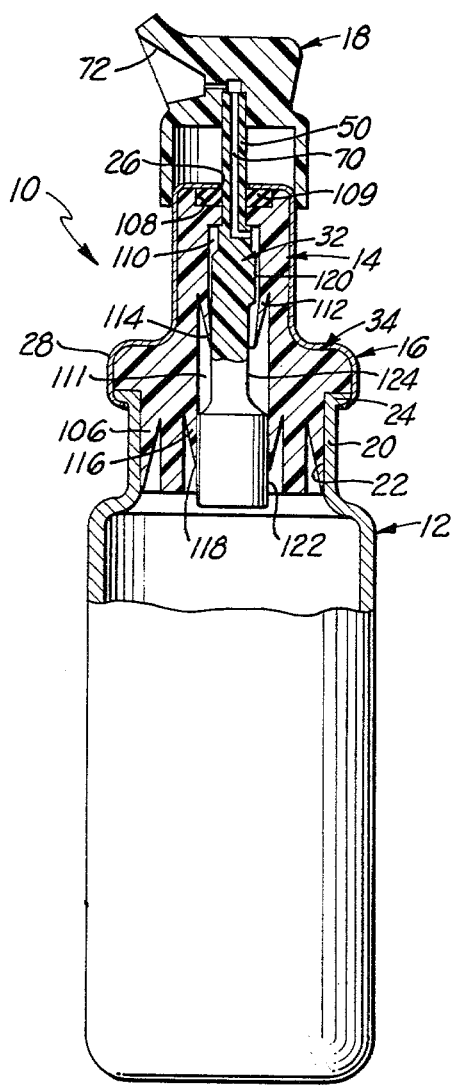
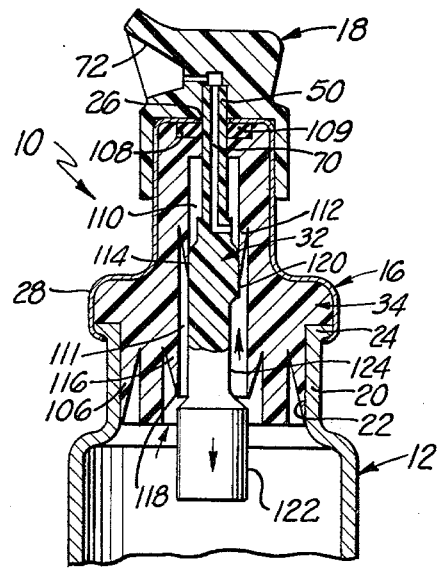
INVENTORS
GENNADY POTAPENKO,
JOHN K. LYON
BY THEIR ATTORNEYS
HARRIS, KIECH, RUSSELL & KERN

United States Patent Office 3,176,890
Patented Apr. 6, 1965

3,176,890
PRESSURIZED DISPENSER WITH INTEGRAL
CONTAINER SEAL
Gennady Potapenko, 1718 Oakdale St., and John K. Lyon, 1176 Afton, both of Pasadena, Calif.
Original application Aug. 14, 1961, Ser. No. 131,395. Divided and this application Mar. 4, 1963, Ser. No. 262,700
5 Claims. (Cl. 222—394)

This application is a division of our co-pending application Serial No. 131,395, filed August 14, 1961.

The present invention relates generally to the container art and more particularly to a novel pressurized dispenser for discharging measured amounts of pressurized fluid material, preferably in spray form.

Briefly stated, the present invention includes a valve assembly mounted in the neck portion of a pressurized container, said assembly including a housing member and a stem member. A passageway providing a transfer chamber and a measuring chamber extends through the housing member for communication with the interior of the container. A plurality of vertical spaced annular flanges or cup-like elements and co-operating cylindrical wall surfaces are provided in the passageway, whereby when the stem member is actuated, fluid under pressure is first admitted to the measuring chamber and a measured amount of fluid is then channeled through the transfer chamber and dispensed from a discharge port contained in an actuating cap. Both the stem member and the housing member are preferably of unitary construction and molded from plastic material.

As is well known in the art, there are many types and styles of pressurized dispensers or containers in use at the present time. However, for the most part the known constructions are relatively expensive and contain numerous parts which require extensive machining and the maintaining of close tolerances.

It is an object of the present invention, therefore, to provide a novel pressurized dispenser which is extremely simple in construction and relatively inexpensive to manufacture. More particularly, it is an object to provide such a dispenser which consists essentially of a container and a simple two-part valve assembly.

Another object is to provide a dispenser which contains a relatively simple and inexpensive valve for dispensing measured amounts of fluid material. More particularly, it is an object to provide such a valve which consists essentially of two parts which function both as a valve and as a measuring means. Specifically, it is an object to provide a simple valve which also functions as a measuring means, and which can be molded from conventional plastic materials.

Yet another object is to provide a valve construction whereby the container can be pressurized by connecting the discharge side of the valve to a source of pressurized gas.

Further objects and advantages of the present invention will be apparent from the following detailed description, reference being had to the accompanying drawings wherein preferred embodiments of the present invention are shown.

In the drawings:

FIG. 1 is a vertical sectional view of a pressurized dispenser constructed in accordance with the teachings of the present invention, showing the valve in the closed position relative to the interior of the container after a measured amount of fluid material has been discharged from the device; and FIG. 2 is a fragmentary vertical sectional view of the upper porition of the dispenser shown in FIG. 1, showing the valve in the open position in communication with the interior of the container to receive a predetermined amount of fluid material.

Referring to the drawings more particularly by reference numerals, 10 indicates generally a pressurized dispenser with integral container seal embodying the teachings of the present invention, which includes a container 12, a valve assembly 14, a tubular connector 16 fastening the valve assembly to the container, and an actuating cap 18 at the upper end of the device.

The container 12 is of conventional construction and preferably molded of plastic material, and includes a neck portion 20 with an inner wall surface 22 and an upper lip 24.

The tubular connector 16 which may be made of metal fastens the valve assembly to the container and includes an aperture 26 at the upper end thereof, and a flange 28 at the lower end which engages the lip 24 of the container.

The valve assembly includes a valve housing member 34 fastened to the neck portion 20 of the container 12 by means of the tubular connector 16 as mentioned above, and a valve stem member 32 with an upper stem portion 50 which receives the actuator 18 at the upper end thereof, the actuator being provided with an outlet port 72.

The inner or bottom end of the valve housing member 34 is provided with an outer depending annular flange or skirt 106 which extends outwardly into sealing engagement with the wall surface 22 of the neck portion 20. The upper or outer end of said valve housing member is provided with an annular recess 108 which contains a sealing washer 109 which receives the stem portion 50 in sliding sealing engagement.

A valve stem receiving passageway with an upper transfer chamber 110 and a lower measuring chamber 111 extends through the valve housing member and is adapted to communicate with the interior of the container. This passageway includes an upper annular flange or cup-like sealing element 112 which extends downwardly and inwardly and terminates in a lip portion 114. A similar lower cup-like sealing element 116 with a lip portion 118 is provided at the lower or inner end of said passageway. The valve stem member 32 includes an upper wall surface 120 and a lower wall surface 122 of increased diameter, one side of the wall surface 120 being cut away or flattened as at 124 for a purpose to appear. The upper wall surface 120 has a diameter which is less than the diameter of the upper transfer chamber 110 and greater than the diameter at the lip portion 114, whereby the latter is in sliding sealing engagement with said upper wall surface 120, i.e. except when it registers with the flattened area 124. In like manner, the diameter of the lower wall surface 122 is less than the diameter of the lower or measuring chamber 111 and greater than the diameter at the lip portion 118.

Thus, when the valve stem member 32 is in the closed position (FIG. 1) the engagement of the lip portion 118 of the lower cup-like element with the lower wall surface 122 prevents the passage of fluid from the container 12. Also, the force of the fluid acting against the outer surfaces of the lower cup-like element increases the sealing effect of it. When the valve stem member 32 is moved downwardly to the open position (FIG. 2) pressurized fluid passes upwardly around the lower wall surface 122, through the lower cup-like element 116 and into the measuring or metering chamber 111, the upper end of which is defined by the upper cup-like element 112. When the cap 18 is released and the valve stem member 32 moves upwardly, the upper portion of the lower wall surface 122 will reengage the lip portion 118 of the lower cup-like element 116 before the flattened area 124 passes the lip portion 114, whereby a measured amount of fluid is trapped between the upper and lower cup-like elements. As the valve stem member 32 continues to move upwardly, the flattened portion 124 passes under the lip portion 114 whereby the fluid in the metering chamber 111 passes around the upper wall surface 120 into the transfer chamber 110, through the discharge passageway 170, and out through the discharge port 72.

The pressurizing or charging of the container can be accomplished by connecting the upper part of the discharge passageway 70 to a source of pressurized gas. This can be done when the valve is either in its closed or open position because the cup-like elements 112 and 116 will flex outwardly and away from their co-operating wall surfaces when the flow of fluid material is in the downward direction at an increased pressure.

Each of said housing and valve members is preferably of unitary construction and molded from plastic material. Also, it is preferable that the material from which the housing member is molded be softer than the stem member so that the sealing elements will flex before the wall surfaces are deformed.

Thus, it is apparent that there has been provided a novel pressurized dispenser which fulfills all of the objects and advantages sought therefor.

It is to be understood that the foregoing description and the accompanying drawings have been given only by way of illustration and example and that changes and alterations in the present disclosure which will be readily apparent to one skilled in the art are contemplated as within the scope of the present invention.

We claim:

1. A pressurized container, comprising:
    a container having a neck portion;
    a valve assembly fastened to said neck portion and including a housing member;
    a passageway through said housing member and including an upper end, said passageway being adapted to communicate with the interior of the container;
    vertically spaced intermediate and lower continuous flange elements with inner lip portions provided in said passageway,
        the intermediate flange element and the upper end of the passageway defining in part a transfer chamber, and the intermediate and lower flange elements defining in part a measuring chamber;
    an elongated stem member mounted in the passageway for axial movement relative to the housing member between an open position and a closed position,
        said stem member containing an upper wall surface adapted to engage the lip portion of the intermediate flange element in sealing relationship, and a lower wall surface adapted to engage the lip portion of the lower flange element in sealing relationship;
    means providing communication between the measuring chamber and the transfer chamber when the stem member is in the closed position, the lip portion of the lower flange element being in sealing engagement with the lower wall surface when the stem member is in said closed position;
    the lip portion of the intermediate flange element and the upper wall surface being in sealing engagement, and the lip portion of the lower flange element and the lower wall surface being in axial spaced relationship to provide communication between the interior of the container and the measuring chamber when the stem member is in the open position; and
    passage means between the exterior of the container and the transfer chamber.

2. The pressurized dispenser set forth in claim 1 in which the valve housing member and the valve stem member are molded from plastic material, and each is of unitary construction.

3. The pressurized dispenser set forth in claim 1 in which the valve housing member and the valve stem member are molded from plastic material, and the material used for the housing member is softer than the material used for the stem member.

4. A pressurized container, comprising:
    a container having a neck portion;
    a valve assembly fastened to said neck portion and including a housing member;
    a passageway through said housing member and including an upper end, said passageway being adapted to communicate with the interior of the container;
    vertically spaced intermediate and lower annular cup-like flange elements with inwardly and downwardly extending lip portions provided in said passageway,
        the intermediate flange element and the upper end of the passageway defining in part a transfer chamber, and the intermediate and lower flange elements defining in part a measuring chamber;
    an elongated stem member mounted in the passageway for axial movement relative to the housing member between an open position and a closed position,
        said stem member containing an upper cylindrical wall surface adapted to engage the lip portion of the intermediate flange element in sealing relationship, and a lower cylindrical wall surface adapted to engage the lip portion of the lower flange element in sealing relationship;
    a groove in the stem member providing communication between the measuring chamber and the transfer chamber when the stem member is in the closed position, the lip portion of the lower flange element being in sealing engagement with the lower wall surface when the stem member is in said closed position;
    the lip portion of the intermediate flange element and the upper wall surface being in sealing engagement, and the lip portion of the lower flange element and the lower wall surface being in axial spaced relationship to provide communication between the interior of the container and the measuring chamber when the stem member is in the open position; and
    passage means between the interior of the container and the transfer chamber.

5. A pressurized dispenser, comprising:
    a container having a neck portion with an inner wall surface;
    a valve assembly positioned in said neck portion and including a housing member
    an outer annular depending flange element provided on said housing member, said flange element being in sealing engagement with said inner wall surface of the neck portion;
    a passageway through said housing member and including an upper end, said passageway being adapted to communicate with the interior of the container;
    vertically spaced intermediate and lower continuous flange elements with inner lip portions provided in said passageway,
        the intermediate flange element and the upper end of the passageway defining in part a transfer chamber, and the intermediate and lower flange elements defining in part a measuring chamber;

an elongated stem member mounted in the passageway for axial movement relative to the housing member between an open position and a closed position,
- said stem member containing an upper wall surface adapted to engage the lip portion of the intermediate flange element in sealing relationship, and a lower wall surface adapted to engage the lip portion of the lower flange element in sealing relationship;

means providing communication between the measuring chamber and the transfer chamber when the stem member is in the closed position, the lip portion of the lower flange element being in sealing engagement with the lower wall surface when the stem member is in said closed position;

the lip portion of the intermediate flange element and the upper wall surface being in sealing engagement, and the lip portion of the lower flange element and the lower wall surface being in axial spaced relationship to provide communication between the interior of the container and the measuring chamber when the stem member is in the open position; and passage means between the exterior of the container and the transfer chamber.

References Cited by the Examiner

UNITED STATES PATENTS

| | | | |
|---|---|---|---|
| 2,565,954 | 8/51 | Dey | 239—579 X |
| 2,744,665 | 5/56 | Carlson et al. | |
| 2,775,483 | 12/56 | Treharne et al. | |
| 2,788,925 | 4/57 | Ward. | |
| 2,831,617 | 4/58 | Soffer. | |
| 2,877,936 | 3/59 | Michel. | |
| 2,973,123 | 2/61 | Rousset | 222—518 X |
| 3,064,865 | 11/62 | Scoggin et al. | |
| 3,109,625 | 11/63 | Steiman et al. | 251—353 |

RAPHAEL M. LUPO, *Primary Examiner.*